United States Patent [19]

Mueller

[11] 4,152,826

[45] May 8, 1979

[54] METHOD FOR SEPARATING THE GROUND AND SIGNAL CONDUCTORS IN A PLURAL CONDUCTOR FLAT CABLE

[75] Inventor: Harry B. Mueller, Hollywood Hills, Fla.

[73] Assignee: Burroughs Corporation, Detroit, Mich.

[21] Appl. No.: 905,717

[22] Filed: May 15, 1978

[51] Int. Cl.² .................................................. H01B 13/00
[52] U.S. Cl. ......................................... 29/624; 29/427; 339/17 F
[58] Field of Search .................... 29/624, 426, 427; 174/117 F; 339/17 F, 176 MF; 81/9.5 R, 9.5 B, 9.5 C, 9.51

[56] References Cited

U.S. PATENT DOCUMENTS

| | | | |
|---|---|---|---|
| 3,731,251 | 5/1973 | Sinclair | 339/17 F |
| 3,794,522 | 2/1974 | Mueller et al. | 174/117 F X |
| 3,864,011 | 2/1975 | Huber | 339/176 MF X |
| 4,040,704 | 8/1977 | Huber | 339/176 MF X |

*Primary Examiner*—C. W. Lanham
*Assistant Examiner*—C. J. Arbes
*Attorney, Agent, or Firm*—Robert J. Gaybrick; Edward J. Feeney, Jr.; Kevin R. Peterson

[57] ABSTRACT

A method for separating the signal carrying conductors from the ground conductors in a plural conductor flat cable to enable the connection of the ground conductors to a grounding plane and the insertion of the signal conductors into the terminals of a connector block. The method comprises the steps of severing the insulation surrounding the ground and signal conductors in a flat conductor cable, sliding the severed insulation along the conductors away from the main body of the cable, bending the ground conductors at right angles with respect to the flat cable, and sliding the insulation back along the signal conductors until it abuts the main body of the flat cable.

6 Claims, 5 Drawing Figures

METHOD FOR SEPARATING THE GROUND AND SIGNAL CONDUCTORS IN A PLURAL CONDUCTOR FLAT CABLE

FIELD OF THE INVENTION

The invention relates with particularity to a method for separating the ground conductors from the signal carrying conductors in a flat conductor cable.

BACKGROUND OF THE INVENTION

Multiple conductor flat conductor cables are extensively used in many areas of electronic machine manufacture. In particular, flat conductor cables are used as backplane wiring to interconnect various circuit boards and other modules within computer systems. These flat conductor cables oftentimes carry a plurality of signal carrying conductors and ground conductors associated with each signal carrying conductor. It is necessary to separate the signal carrying conductors from the ground conductors when the conductors are attached to a connector block. It is important while separating the signal conductors from the ground conductors that no damage be done to any of the conductors which would tend to degrade their conducting properties. While it is thus necessary to be precise and careful while separating the ground conductors from the signal carrying conductors it is also necessary for any method or apparatus to be efficient and productive. In accomplishing this it would be desirable to have a method and apparatus for simultaneously separating a selected plurality of ground conductors from their associated signal carrying conductors.

The flat multiple conductor cable which is commonly used in electronic equipment employs a high quality dielectric insulation to separate the conductors. A suitable insulative material is a fluorocarbon resin film tetrafluoroethylene marketed by DuPont under the trademark TFE. A suitable process for the preparation of Teflon TFE is described in U.S. Pat. Nos. 2,478,229 and 2,559,752. Polyimide films as described in U.S. Pat. No. 3,179,674 and marketed by DuPont under the trademark Kapton and Polykapton have also been employed as insulators in flat cables. It is necessary to strip this insulation off the conductors before the conductors are mounted in the connected block over the ground plane. The instant invention discloses a method for stripping the insulation from the signal carrying conductors and the ground conductors and separating the signal carrying conductors from the ground conductors before they are connected to a connector block.

SUMMARY OF THE INVENTION

It is an object of this invention to provide a method for stripping the insulation from a plurality of signal carrying conductors and ground conductors and for simultaneously separating all of the signal carrying conductors from the ground conductors.

It is another object of this invention to provide a method for retaining the insulative sheathing around selected conductors while stripping the insulative sheathing from selected other conductors.

It is a further object of this invention to provide a simple, productive and precise method for stripping the insulation from selected conductors in a multiple conductor flat cable.

It is yet another object of this invention to provide a method for stripping the insulation from selected conductors in a multiple conductor flat cable and separating the stripped conductors from the rest of the conductors in the cable while retaining the insulative sheathing around the nonselected conductors.

These and other object are accomplished by slitting the insulative sheathing around the conductors in a multiple conductor flat cable with the slit extending transverse to the length of the cable and not penetrating into the conductors themselves. The insulation which has been severed from the main body of the cable is slid away from the main body along the conductors. Selected conductors are then withdrawn from the severed portion of the insulative material and deformed from the plane of the flat cable. The severed insulation is then slid back along the non-deformed conductors such that it abuts the main body of the cable to result in the non-deformed conductors extending along the plane of the flat cable and the deformed conductors extending at an angle with respect to the plane of the flat cable.

The novel features which are believed to be characteristic of this invention are set forth with particularity in the appended claims. The invention itself, however, both in its organization and method of operation together with further objects and advantages thereof, may best be understood with reference to the following written description when considered with the accompanying drawings.

DETAILED DESCRIPTION OF THE PREFERRED EMBODIMENT

Figure 1:
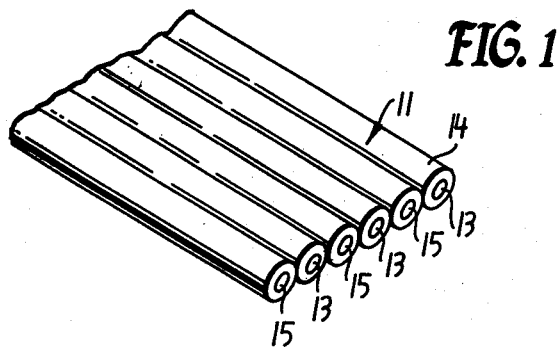
FIG. 1 is a view of a typical flat conductor cable.

Referring to FIG. 1 there is shown a multiple-conductor flat cable 11 having conductors of a first type 13 and of a second type 15. These conductors are covered by an appropriate insulative material 14. In many applications the conductors 13 would be ground conductors and the conductors 15 would be signal carrying conductors with each signal carrying conductor 15 being associated with one of the ground conductors 13.

Figure 2:
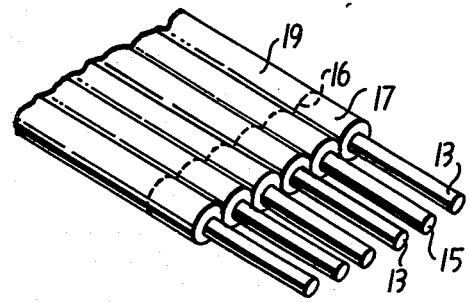
FIG. 2 is a view of the cable of FIG. 1 which has been severed along a line transverse to its length.

In FIG. 2 the insulative coating 14 surrounding the conductors 13 and 15 of the multiple conductor flat cable 11 has been severed along line 16 to provide a main body of the cable 19 and a severed portion of the insulation 17. The severed portion 17 can be slidably displaced along the conductors 13 and 15 to separate the severed portion 17 from the main body of the conductor 19. There are numerous known devices for forming a sever line such as 16 in the insulation. One such device is made by Carpenter Manufacturing Company, Inc. of Martins, New York. Their model 47a is a flat cable stripper and will sever the insulation 14 without damaging the conductors 13 and 15. In U.S. Pat. No. 3,794,522 assigned to the common assignee, there is shown a method of stripping insulated wire which contemplates displacing the severed portion of the insulation along the signal carrying conductors. The teachings of that patent are hereby incorporated by reference for the purposes of disclosure.

Figure 3:
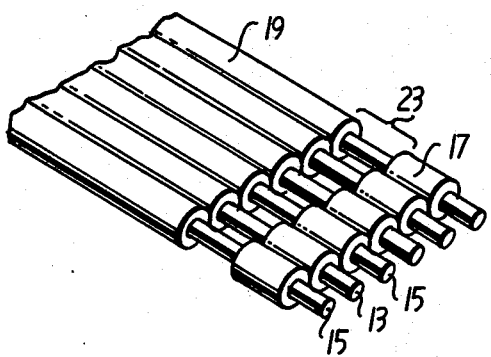
FIG. 3 is the cable of FIG. 2 with the severed insulation displaced along the connectors.

FIG. 3 shows the cable of FIG. 2 with the severed portion of insulation 17 slid away from the main body of the cable 19 to form a separation 23. The conductors 13 and 15 still extend through these severed portions 17 of the insulation and are exposed in the area 23.

Figure 4:
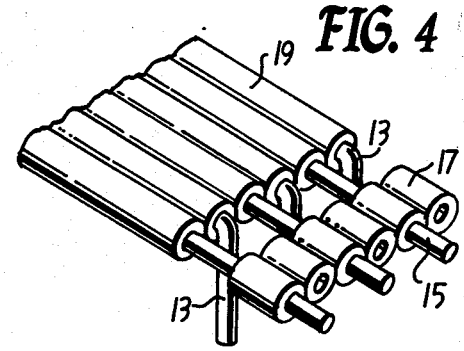
FIG. 4 is the cable of FIG. 3 with selected conductors bent transversely to the plane of the cable.

The step for separating the signal carrying conductors from the ground conductors is shown in FIG. 4. In FIG. 4 the ground conductors 13 have been pulled from the severed insulative portion 17 and bent at one angle with respect to the plane of the flat cable. The signal carrying conductors 15 still extend from the main body of the cable 19 and pass through the severed portion of insulative material 17 so that they are undisturbed by the bending of the ground conductors from the plane of the cable. While the ground conductors can be pulled from the severed insulative material 17 and deformed from the plane of the cable 19 by any of a number of means, it is considered that a plurality of fingers could be disposed above the conductors 13 and 15 and these fingers would be associated with individual solenoids such that actuation of a solenoid would reciprocate a finger transversely to the plane of the cable 19. If a reciprocated finger would lie above a conductor 13, an appropriate notch in the finger would engage the conductor 13 as it extends in the plane of the cable and apply a downward force to both withdraw the conductor 13 from the severed portion of insulation and deform the conductor from the plane of the cable 19. While the combination of solenoid and notched fingers would be one means of sliding the conductors 13 from the severed portion of the insulation 17 and bending the conductors 13 out of the plane of the cable 19 it would be understood by one skilled in the art that there are many other devices which could accomplish the same withdrawal and bending step. It is not desired to limit the instant invention to any particular apparatus for withdrawing and bending the conductors 13.

Figure 5:
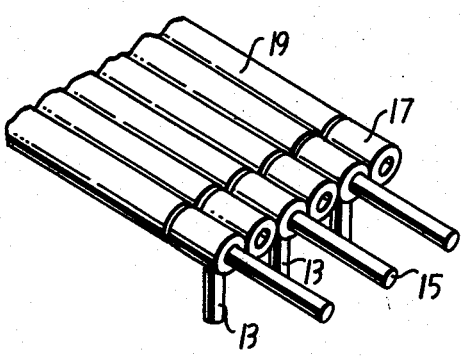
FIG. 5 is the cable of FIG. 4 with the severed insulation replaced in an abutting relationship with the main body of the cable.

In FIG. 5 the severed portion of insulative material 17 has been slid along the signal carrying conductors 15 toward the main body of the flat cable 19. The severed insulation 17 is caused to abut the main body of the cable 19 to further expose the conductors 15 at their distal end while continuing to insulate the conductors 15 proximate the main body of the cable. As the cable is shown in FIG. 5 it is ready to be connected to a suitable connector block with the ground conductors 13 being separated from the signal carrying conductors 15 such that the conductors 15 could be inserted in appropriate terminals of the connector block and the conductors 13 attached to a common ground plane or to other terminals in a connector block. Again, there could be many designs for the terminal block to which the conductors 13 and 15 would be connected and one skilled in the art would select an appropriate connector block according to the application involved.

The previously incorporated patent discloses an infrared heating apparatus for stripping the insulation from the conductor cables. It is contemplated in the instant invention as shown in FIG. 5 that the severed portion of the insulative material 17, when it has been slid back into an abutting relationship to the main body of the cable 19 would have infrared radiation focussed along the line of severance to melt the insulative material and reseal the gap between the main body of the cable 19 and the severed portion of the insulative material 17. This could be accomplished by selecting an appropriate mask size for the apparatus disclosed in the incorporated patent.

The invention which has been described in detail provides a simple, efficient manner for separating the ground conductors from the signal carrying conductors of a multiple conductor flat cable. The method comprises steps of severing a portion of insulation from the main body of the cable, sliding that portion away from the main body of the cable along the conductors, removing selected conductors from the severed portion of the insulative material and bending the conductors away from the plane of the cable and sliding the severed portion of insulation back into an abutting relationship to the main body of the cable. An optional step has been disclosed which includes applying infrared radiation along the line of severance to reseal the gap between the severed portion of insulative material and the main body of the cable. The invention as described sets forth a novel method for separating selected conductors from a plurality of conductors in a multiple conductor flat cable.

The foregoing description is intended to be explanatory of a method for separating the conductors of a multiple conductor flat cable so they can be easily attached to the appropriate terminals of a connector block. It will be understood from the foregoing that various changes may be made in the steps of the method and the apparatus for performing the steps without departing from the spirit of the invention.

I claim:

1. A method of stripping insulation from selected conductors in an insulated multiple conductor flat cable and for separating the selected stripped conductors from the remaining conductors in the cable comprising the steps of:
    severing a portion of insulation from said cable along a line transverse to the length of said cable;
    sliding said severed portion along said conductors away from the main body of the cable;
    removing selected conductors from said severed portion; and
    returning said severed portion along said non-removed conductors to abut the main body of said cable.

2. The method of claim 1 further including the step of bending said removed conductors away from said cable prior to returning said severed portion to abut the main body of the cable.

3. The method of claim 1 further including the step of heating said severed portion of insulation after it has been returned to abut the main body of the cable until said severed portion is melted and rejoined with the insulation on the main body of the cable.

4. A method for stripping the insulation from selected conductors in an insulated multiple conductor flat cable and separating said stripped conductors from the remaining conductors in said cable comprising the steps of:
    severing a portion of insulation from the main body of the cable;
    sliding said severed portion along said conductors away from the main body of the cable;
    removing selected conductors from said severed portion of insulation;
    bending said selected conductors away from the plane of the cable; and sliding the severed portion of insulation along said non-selected conductors into an abutting relationship to the main body of the cable.

5. A method for stripping the insulation from the ground conductors of a multiple conductor flat cable having ground conductors and signal conductors and for insulatively separating said ground conductors from said signal conductors, said method comprising the steps of:

severing a portion of insulation from the main body of the cable;

sliding said severed portion along said conductors away from the main body of the cable;

removing said ground conductors from said severed portion of insulation;

bending said ground conductors away from the plane of the cable; and sliding the severed portion of insulation along said signal conductors until said severed portion abuts the main body of said cable.

6. The method of claim 5 further including heating the insulation of said cable main body and said severed portion proximate said sever to bond said severed portion of insulation to the insulation of the main body of said cable.

* * * * *